United States Patent [19]

Carey

[11] 4,333,900

[45] Jun. 8, 1982

[54] PROCESS FOR MANUFACTURE OF HIGH VOLTAGE TRANSFORMERS AND THE LIKE

[75] Inventor: James J. Carey, Henrietta, N.Y.

[73] Assignee: Chloride Electro Networks, Division of Chloride, Inc., N. American Operation, Tampa, Fla.

[21] Appl. No.: 80,208

[22] Filed: Oct. 1, 1979

Related U.S. Application Data

[63] Continuation of Ser. No. 856,998, Dec. 2, 1977, abandoned.

[51] Int. Cl.$^3$ .......... H02K 15/12

[52] U.S. Cl. .......... 264/85; 264/102; 264/261; 264/263; 264/272.19; 336/96; 336/84 C

[58] Field of Search .......... 427/116, 295; 336/96, 336/209, 84 C; 264/85, 102, 263, 261, 272.19

[56] References Cited

U.S. PATENT DOCUMENTS

| | | | |
|---|---|---|---|
| 3,102,161 | 8/1963 | Raisbeck | 174/127 |
| 3,376,530 | 4/1968 | Fischer | 336/84 C |
| 3,531,321 | 9/1970 | Arlesheim | 427/116 |
| 3,699,488 | 10/1972 | Goodman et al. | 336/84 C |
| 3,750,071 | 7/1973 | Eley | 336/84 C |
| 3,851,287 | 11/1974 | Miller et al. | 336/84 C |
| 3,886,510 | 5/1975 | Canup et al. | 336/84 C |
| 3,925,744 | 12/1975 | Canney | 336/96 |
| 3,979,530 | 9/1976 | Schwider | 427/104 |
| 3,991,232 | 11/1976 | Keminchi | 427/104 |
| 4,009,306 | 2/1977 | Yamashita | 427/116 |
| 4,054,680 | 10/1977 | Sharbaugh | 427/116 |

*Primary Examiner*—Michael R. Lusignan
*Assistant Examiner*—Richard Bueker
*Attorney, Agent, or Firm*—Finnegan, Henderson, Farabow, Garrett & Dunner

[57] ABSTRACT

A process for making an encapsulated electrical insulation system such as a transformer which includes a porous fiber material filling. The system is vacuum baked at a temperature range of 100° C. to 155° C. for at least four hours, and is then vacuum impregnated with a mixture of a modified bisphenol A epoxy resin hardener comprising various acid anhydrides plus promoters. Pressure is then applied to the system of 1,000 psi. of nitrogen at 80° C. for 2 to 12 hours. Thereafter, the temperature is increased to 110° C. for 2 to 12 hours. The system is then cured at 135° C. for approximately 12 to 24 hours. To minimize corona, shields are placed in selected portions of the transformer, the shields having edges formed into radii ends to avoid points at which corona would normally tend to concentrate. Also, the transformer is wound using ultra-clean components to obtain a transformer package that is free from impurities prior to impregnation.

3 Claims, 2 Drawing Figures

PROCESS FOR MANUFACTURE OF HIGH VOLTAGE TRANSFORMERS AND THE LIKE

This is a continuation of application Ser. No. 856,998 filed Dec. 2, 1977, now abandoned.

BACKGROUND OF THE INVENTION

1. Field of the Invention

The invention relates to a method for encapsulating and insulating high voltage transformers, capacitors, power supplies and the like, to provide a corona free atmosphere at high operating temperatures and voltages.

2. Description of the Prior Art

The prior art discloses vacuum impregnated epoxy resin insulation systems for high voltage transformers and the like to reduce corona. For example, note Schwider et al., U.S. Pat. No. 3,979,530. Also note in this regard the U.S. Pat. to Kamiuchi et al. v. Kolator, Nos. 3,991,232 and 3,587,168, respectively.

It is also known in the prior art that corona discharge may be minimized by providing rounded surfaces on electrical conductors. For example, note Raisbeck, U.S. Pat. No. 3,102,161 which discloses the reduction of corona discharge by rounding the sharp corners and edges of a conductor. Kanney, U.S. Pat. No. 3,925,744 relates to the use of end caps for the primary winding of a transformer having a radius to relieve the electrical stress of the sharp edges of the primary winding.

SUMMARY OF THE INVENTION

The instant invention provides an improved vacuum impregnated insulation and encapsulation process for high voltage transformers, capacitors and the like using selectively placed shields designed to control the electric field and minimize corona.

It is an object of this invention to provide improved high voltage electrical insulation in the fabrication of high voltage transformers, capacitors, power supplies and the like having high dielectric strength, low dielectric losses and corona free operation at high voltage levels. Devices made in accordance with the invention have proven to give long life operating at relatively high temperature levels in the range of 155° C. class of insulation.

To accomplish this object, a process for manufacturing such devices has been developed comprising high voltage insulation and electric field control shields. The insulation provided is composed of a low viscosity, high temperature, undiluted epoxy resin. This resin has exceptional wetting properties, toughness and excellent high temperature electrical characteristics.

The fillers used are ultrasonically cleaned porous polyester and/or Nomex fibers in the form of thin paper or felt which are wound, when used in the manufacture of transformers, into the coil during the manufacture of the coil. These fillers, along with the epoxy resin, allow the coil to withstand severe thermal cycling necessary to meet military environment requirements and provide excellent high temperature electrical properties. Specially constructed shields with all outer surface radii, are wound into the coil at places of high electric stress. These shields are used to uniformly distribute the electric field and prevent areas of high electric field concentration. The shields are processed to provide ultra clean, oxide free surfaces. The coil is subsequently handled in a manner as not to contaminate the surfaces of these shields or any of the clean fiber insulation.

By using the processes of manufacture in accordance with the invention, a high voltage coil can be produced in a much smaller volume than by conventional methods. Insulation between the high voltage shields can be reduced drastically compared to conventional designs due to the high stress voltages which devices made in accordance with the invention can withstand. Stresses in the range of 1,000 to 2,000 volts RMS per mil of insulation at the radii of the shields is thus possible, while still maintaining the coil essentially corona free. The dielectric losses in the areas between the high electric stress regions between the shield are maintained at a reasonable value when the coils are used in high frequency applications. This is accomplished by the excellent high temperature electrical properties of the resin/-filler system along with the void free construction of the device.

DETAILED DESCRIPTION OF THE INVENTION

Figure 1:
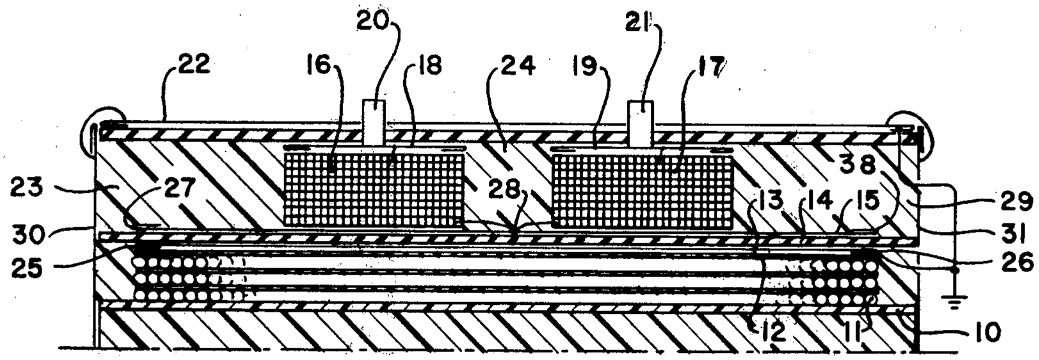
FIG. 1 is a cross-section of a transformer manufactured in accordance with the invention.

FIG. 1 illustrates a part of the process of the invention used in the fabrication of a transformer. FIG. 1 represents a cross-sectional half-view of the transformer with the structure below the center line not being shown for clarity purposes, inasmuch as it would be a mirror image of the structure above the center line.

The transformer comprises a core tube 10 of fiberglass or other suitable material. The primary (low-voltage) winding 11 is wound around tube 10, with adjacent layers of the winding being insulated. The primary winding may comprise copper wire or strip copper and is several layers thick.

A strip 12 of insulation material is wound around the primary winding to insulate it from electrostatic shield 13. Insulation strip 12 comprises a polyester or other type of material. Electrostatic shield 13 comprises one turn of a continuous copper strip overlapping the length of the primary winding, which is wound around the tubular structure thus far described. A mat 14 of insulating material such as porous polyester is then wrapped around the tubular structure to insulate electrostatic shield 13 from corona shield 15. Corona shield 15 comprises a strip of continuous copper wrapped around the tubular structure, with its ends being electrically insulated.

The secondary (high-voltage winding) comprises a pie winding which is wound in two spaced sections 16 and 17 around the tubular structure. One set of leads from each of windings 16 and 17 are connected together at 28 to the mid point of shield 15. The other end of winding 16 is connected to shield 18, and the other end of winding 17 is connected to shield 19. Shields 18 and 19 are wrapped around the windings 16 and 17, respectively, and comprise copper strips. Output leads 20 and 21 are respectively connected to shields 18 and 19.

Insulation material is provided between shields 18 and 19, and electrostatic shield 22. The latter shield is connected to ground, as is electrostatic shield 13, and comprises a continuous copper strip wrapped around the tubular structure with its ends being electrically insulated. The spaces 23, 24 and 29 are filled with a porous insulation material, as are any other void spaces in the tubular structure, during the winding operation. Shields 30 and 31 are provided at the ends of the tubular structure and also have folded edges. As shown, they are connected to shield 22.

Shield 13 is folded inwardly at its edges towards tube 10 to form radii ends 25 and 26. Corona shield 15 is folded at its edges away from tube 10 to form radii ends 27 and 28. These folded portions avoid points at which corona would otherwise concentrate and thereby provide electric field uniformity. The radii ends defined by shields 13 and 15 are opposite in sense to each other to avoid such points, particularly since a voltage of 4,000 to 6,000 volts might typically be seen across these shields. Shields 18, 19 and 22 similarly comprise folded edges, as do leads 20 and 21 at their formation to shields 18 and 19, and the electrically insulated ends of shields 15 and 22. The high voltage termination of the secondary winding is accomplished by shields 18 and 19 formed around winding, which also includes the high voltage coil leads 20 and 21. This type of termination provides a complete shielding of the outer section of the high voltage secondary winding and also functions as a large corona free terminal. The shields and leads may be constructed from copper strips or any other equivalent material.

The secondary winding is center-tapped at 28 by connection to shield 27, because otherwise the wires comprising the winding would appear as points at which corona might concentrate. This also provides a more uniform electric field.

Figure 2:
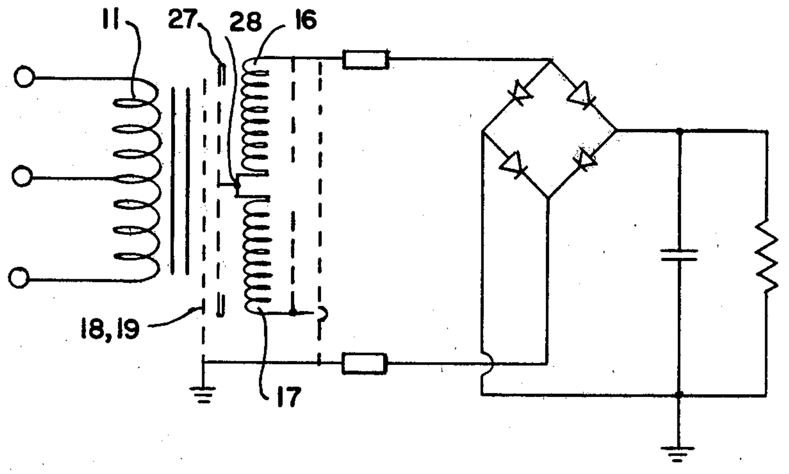
FIG. 2 is a schematic representation of the electric circuit of the transformer of FIG. 1.

FIG. 2 shows the electrical connection of the transformer illustrated in FIG. 1, and used, for exemplary purposes only, in conjunction with a rectifier circuit. The designation numerals used in FIG. 2 identify the same elements correspondingly designated in FIG. 1.

The transformer is constructed with low binder content porous polyester and/or a similar type of fiber interlayer and intrawinding insulation such as Nomex, a registered trademark of Dupont. The material must be porous because it is to be impregnated with a resin, and it must also be a material that will tend to strengthen the resin, functioning as a reinforcement and fibers filler for the resin. The specially constructed shields are placed in selected sections of the transformer to provide a uniform electric field. Before use in manufacture of the transformer, the shields are subjected to an acid etch and/or electrocleaning operation after which they are ultrasonically cleaned in distilled water and wiped dry with isopropanol and then placed in dry nitrogen for storage. All insulation used in the transformer is ultrasonically cleaned in a material such as trichlorethelene and dried in an oven. The wire used for the windings is cleaned in isopropyl alcohol before being wound. After the materials are cleaned they are not handled except by persons using surgical or white cotton gloves in order to prevent contamination of the material used in the transformer.

The cleanliness of all materials and particularly the copper shields is an important aspect of the invention. The copper must be very clean and free from any oxide surface so that the epoxy impregnating resin will have excellent wetting and adhesion to the shields. This will enable a close to perfect bonding to be achieved at the epoxy-shield interface. A separation at this point is one of the chief causes for undesirable corona characteristics, which eventually leads to short transformer life because of electrical breakdown.

The coil is wound without any person handling the wire or insulating materials with their bare hands. The operator uses surgical or other type of gloves during manufacturing.

Before further processing, the transformer structure shown in FIG. 1 is wrapped in a fibrous material such as polyester. The remaining part of the process is applicable not only to the transformer so far described, but to other devices such as capacitors, power supplies and the like. It is to be understood that the transformer of FIGS. 1 and 2 is only exemplary of the types of devices to which the present invention is applicable. However, the remaining part of the process will be described with respect to the transformer embodiment. After the transformer is wound and terminated, it is subjected to the following impregnation process.

1. Vacuum bake in an oven at 100° C. to 155° C. for at least four hours. This vacuum bake is to remove any slight impurities that may be present and completely dry the transformer.
2. After this bake, the vacuum oven is flooded with nitrogen to atmospheric pressure.
3. The transformers are capped off in hermetic containers at 140° C. with nitrogen and allowed to cool to room temperature for storage in this low pressure nitrogen atmosphere.
4. When it is to be processed further, the transformer is removed from storage and placed in a metal mold. The mold is then evacuated to a vacuum of less than 50 microns Hg. for twenty hours at 60° C. to remove all air which might otherwise produce impurities.
5. The resin is then mixed at room temperature using a mixture of advanced bisphenol A epoxy in combination with a heterocyclic difunctional epoxy resin and a hardener comprising a blend of anhydride curing agents and accelerators to provide latency and high reaction in its composition. As an example, a mixture that has proven to be successful with use in the invention includes 100 P.B.W. of Arildite X B 2900 epoxy resin with 100 P.B.W. Arildite X B 2888 hardener, "Arildite" being a Ciba-Giegy trademark. Other equivalent types of resins and hardeners may be used however, without departing from the scope of the invention.
6. The mixture is placed in a vacuum/high-speed mixer tank at 50° C. The high speed mixer is drawn to a vacuum of 0.7–1.5 mm Hg. for 15 to 30 minutes. During this time any air in the resin will be removed to the top of the resin mass where it can be easily removed by the vacuum.
7. After thus preparing the resin, it is admitted into the high vacuum chamber which is operating at less than 50 microns so that it will completely flood the mold. After the reservoir of the mold is full, the vacuum is continued for a few minutes until the chamber again reaches a vacuum of about 100 microns Hg. or less. Nitrogen is then slowly admitted into the chamber until the mold and chamber are at atmospheric pressure.
8. The mold is then placed in a 80° C. pressure vessel. Approximately 1,000 psi. of nitrogen is applied to the mold for 2 to 24 hours.
9. The temperature is then increased to 110° C. at 1,000 psi. for an additional 2 to 12 hours. This enables the resin to be jammed into every portion of the transformer or other unit being processed and provides a very slow curing time.

10. The transformer is then removed from the mold and post-cured at 135° C. for an additional 12 to 24 hours.

The above parameters of time, pressure and temperature are given for exemplary purposes. It should be clear that variations therefrom are permissible without departing from the invention.

The procedure of the invention ensures that the transformer is ultra-pure before the molding step. Further, the described molding process enables the resin to be jammed into all spaces of the transformer, while being cured very slowly so that it has a very low shrinkage. The impregnation of all void spaces in the transformer or other device being processed is important because this serves to reduce the corona. The encapsulation described is particularly advantageous over prior art epoxy encapsulation because the latter when subjected to low temperatures becomes rigid and shrinks slightly thereby exerting great pressure on components and adversely affecting their electrical properties often rendering the prior art system unusable.

Thus, the resin impregnation procedure, taken in conjunction with ensuring that the transformer materials remain as clean as possible and the shaping of the radii ends of the shields, produces a transformer having excellent cold temperature operating characteristics while minimizing corona.

While there have been shown and described what are at present considered to be the preferred embodiments of the invention, modifications will readily occur to those skilled in the art. It is not desired, therefore, that the invention be limited to the specific arrangements shown and described and it is intended to cover in the appended claims all such modifications as fall within the true spirit and scope of the invention.

I claim:

1. A process for making and encapsulating a transformer insulation system comprising:

forming the system with ultra-clean components to obtain a system that is free from impurities;

positioning ultrasonically cleaned porous fiber material as filler and ultra-clean oxide-free copper shields having folded edges to form radii ends near selected portions of the transformer to control the electric field and minimize corona; and processing encapsulation of the system by vacuum baking it in an oven at 100° C. to 155° C. for at least four hours to remove any slight impurities that may be present and completely dry the transformer, then flooding the oven with nitrogen to atmospheric pressure, and capping the transformers off in hermetic containers at approximately 140° C. with nitrogen and allowing them to cool to room temperature for storage in this low pressure nitrogen atmosphere before encapsulation, and vacuum encapsulating the transformer and insulation system.

2. The process as described in claim 1 further comprising:

positioning at least one of said shields between the low and high voltage windings of the transformer.

3. The process as described in claim 2 further comprising:

positioning others of said shields around the periphery of the transformer.

* * * * *